United States Patent
Henkel

(10) Patent No.: US 10,730,364 B2
(45) Date of Patent: Aug. 4, 2020

(54) PELTIER EFFECT AIR DEHUMIDIFIER FOR INSTALLATION IN A CONTAINER

(71) Applicant: Siemens Aktiengesellschaft, München (DE)

(72) Inventor: Thomas Henkel, Röttenbach (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 15/740,276

(22) PCT Filed: Jun. 15, 2016

(86) PCT No.: PCT/EP2016/063739
§ 371 (c)(1),
(2) Date: Dec. 27, 2017

(87) PCT Pub. No.: WO2017/016742
PCT Pub. Date: Feb. 2, 2017

(65) Prior Publication Data
US 2018/0178621 A1    Jun. 28, 2018

(30) Foreign Application Priority Data
Jul. 28, 2015   (EP) .................................... 15178670

(51) Int. Cl.
*B60H 1/00* (2006.01)
*B60H 3/02* (2006.01)
(Continued)

(52) U.S. Cl.
CPC ......... *B60H 1/00478* (2013.01); *B60H 3/024* (2013.01); *B61D 27/00* (2013.01);
(Continued)

(58) Field of Classification Search
CPC . F25B 21/02–04; F25B 2321/02–0252; B60H 1/00478; B60H 3/024; F24F 5/0042; F24F 2003/1446
(Continued)

(56) References Cited

U.S. PATENT DOCUMENTS 3,445,039 A    5/1969   Brodsky et al.
3,607,444 A *  9/1971   DeBucs ................. F25B 21/02
                                                      136/208
(Continued)

FOREIGN PATENT DOCUMENTS

CN    101884120 A    11/2010
CN    202446972 U    9/2012
(Continued)

OTHER PUBLICATIONS

PCT International Search Report and Written Opinion of International Searching Authority dated Sep. 7, 2016 corresponding to PCT International Application No. PCT/EP2016/063739 filed Jun. 15, 2016.

*Primary Examiner* — Joel M Attey
(74) *Attorney, Agent, or Firm* — Henry M. Feiereisen LLC

(57) ABSTRACT

A dehumidifier unit for dehumidifying air in a container includes a Peltier element which is configured as a single-stage Peltier element and thermally connected to a cold side and to a warm side of the dehumidifier unit. The cold side is configured condense moisture of the air during operation of the dehumidifier unit. The Peltier element is clamped between the warm side and the cold side by a helical spring and a spring pin. A gland-type seal can be disposed on a side of the warm side in facing relation to the Peltier element. The gland-type seal includes a rubber bush which is received (Continued)

in a recess on the warm side and defined by an inner diameter which surrounds the clamping pin.

17 Claims, 5 Drawing Sheets

(51) Int. Cl.
*B61D 27/00* (2006.01)
*F24F 5/00* (2006.01)
*F24F 3/14* (2006.01)
*F25B 21/02* (2006.01)
*F25B 21/04* (2006.01)

(52) U.S. Cl.
CPC .... *F24F 5/0042* (2013.01); *F24F 2003/1446* (2013.01); *F25B 21/02* (2013.01); *F25B 21/04* (2013.01)

(58) Field of Classification Search
USPC .............................................. 62/3.4
See application file for complete search history.

(56) References Cited

U.S. PATENT DOCUMENTS

| | | | |
|---|---|---|---|
| 3,934,758 A | 1/1976 | Kipp | |
| 4,279,292 A | 7/1981 | Swiatosz | |
| 5,209,069 A * | 5/1993 | Newnan | B01F 13/0827 222/146.6 |
| 6,250,083 B1 * | 6/2001 | Chou | F24F 3/14 62/3.4 |
| 2010/0173400 A1 * | 7/2010 | Atwood | B01L 7/52 435/303.1 |
| 2010/0258156 A1 | 10/2010 | Inatomi et al. | |
| 2013/0319014 A1 | 12/2013 | Heule et al. | |
| 2014/0127451 A1 * | 5/2014 | Pilpel | B32B 5/12 428/113 |
| 2015/0153088 A1 * | 6/2015 | Kim | F25D 3/08 62/457.4 |
| 2015/0375229 A1 * | 12/2015 | Possinger | B01L 3/502784 435/91.2 |

FOREIGN PATENT DOCUMENTS

| | | | | |
|---|---|---|---|---|
| EP | 2 327 944 A1 | 6/2011 | | |
| GB | 900 043 A | 7/1962 | | |
| JP | 2003219670 A | 7/2003 | | |
| RU | 2013142093 A | 3/2015 | | |
| WO | WO-2004031870 A2 * | 4/2004 | ........... | G04B 37/103 |

* cited by examiner

PELTIER EFFECT AIR DEHUMIDIFIER FOR INSTALLATION IN A CONTAINER

CROSS-REFERENCES TO RELATED APPLICATIONS

This application is the U.S. National Stage of International Application No. PCT/EP2016/063739, filed Jun. 15, 2016, which designated the United States and has been published as International Publication No. WO 2017/016742 and which claims the priority of European Patent Application, Serial No. 15178670.4, filed Jul. 28, 2015, pursuant to 35 U.S.C. 119(a)-(d).

BACKGROUND OF THE INVENTION

The invention relates to a dehumidifier unit for dehumidifying air in a container having at least one Peltier element. Furthermore the invention relates to a container, in particular to a power converter container, having a dehumidifier unit of this type and also to a vehicle, in particular to a rail vehicle, having a dehumidifier unit of this type. Furthermore the invention relates to a method for dehumidifying air in the interior of a container.

Dehumidification serves to protect electronic or power electronics components and modules. These are mostly arranged in containers. In vehicles such as rail vehicles for example these containers are often embodied as underfloor containers, roof containers and locomotive power converter containers complying with protection type IP54, in order to offer a defined minimum level of protection from environmental influences for the technical components enclosed in said container and for the overall system. However the intrusion of humidity into the container is not prevented or is only inadequately prevented by this type of protection.

Possible effects of humidity are occurrences of corrosion and migration at semiconductor structures and solder, in particular at non-encapsulated power semiconductors, with significant potential for damage and the effect of reducing the service life even far below the permitted values for relative air humidity given in the data sheets.

A completely airtight embodiment of containers for protection of electronic components is expensive and associated with a high weight of the corresponding container. However it is precisely for vehicles that the market demands low-cost and lightweight solutions.

A further possibility for reducing the air humidity in the interior of containers consists of introducing into these containers drying agents, such as gel drying agents that extract humidity from the air for example. The disadvantage that exists here however is that these drying agents have to be replaced at regular intervals when the gel becomes saturated. This gives rise to short maintenance intervals precisely in regions of high air humidity or where air humidity fluctuates greatly. This maintenance work restricts the availability of the corresponding device or vehicle and above and beyond this increases the costs for operation. The external regeneration of the drying agent or the use of new drying agent further increases the costs when using these drying agents.

Commercially-available switching cabinet cooling devices with a coolant circuit, which in some cases, when expanded by means of additional parts, are suitable for dehumidifying air, are driven as a rule by an alternating current motor. These have the disadvantage of a relatively complex construction with a comparatively high space requirement.

Furthermore Peltier-effect dehumidifier units are available on the market for use in switching cabinets, inter alia with wall mounting, for an ambient temperature of up to around 30° C. In such devices the warm side of the dehumidifier unit is attached to the wall such that the warm side will be cooled by the air outside the switching cabinet and humidity condenses on the cold side, embodied as a condensation plate for example, in the interior of the switching cabinet. Stationary systems and installations in the outdoor area, e.g. for telecommunications, are equipped with this planned and prepared wall mounting, in order to make use of the potentially lower outside temperature, which is of advantage for the function of the device and for a low use of energy.

The stronger is the undercooling of the cold side (between approximately 0° C. and dew point temperature >0° C.) the greater is the condensation power and also the also the minimal air humidity that can be achieved at a specific air temperature. Condensation power refers to the quantity of condensed humidity per unit of time.

To increase the cooling power a number of Peltier elements will usually be arranged in parallel.

In a few application cases, such as for example for use in vehicles, it has turned out to be disadvantageous to provide a cutout in the outer walls of switching cabinets or other containers, into which a dehumidification unit can be introduced, in order to cool its warm side with the ambient air. Then, by comparison with such containers with a closed surface, these containers have a greatly reduced stability. In order to achieve the desired or required mechanical stability the container must be strengthened for example by the introduction of further struts. This in its turn is at the expense of the weight of the container and thus of a vehicle equipped therewith.

SUMMARY OF THE INVENTION

The underlying object of the invention is to specify a solution for dehumidifying air in the interior of a container.

The object is achieved by a dehumidifier unit for dehumidifying air in a container with at least one Peltier element, wherein the Peltier element is embodied as a single-stage Peltier element, wherein the Peltier element is thermally connected to a cold side and to a warm side, wherein the cold side is equipped such that, during operation of the dehumidifier unit, humidity of the air condenses on the cold side, wherein the Peltier element is clamped in between warm side and cold side by means of a helical spring and a clamping pin.

The object is further achieved by a container with a dehumidifier unit of this type, wherein the dehumidifier unit is arranged completely within the interior of the container.

The object is further achieved by a vehicle, in particular by a rail vehicle, with a container of this type.

The object is further achieved by a method for dehumidifying air in the interior of a container by means of a dehumidifier unit of this type, wherein a condensation power of the dehumidifier unit is controlled or regulated depending on the temperature of the cold side.

Advantageous embodiments of the invention are specified in the independent claims.

The invention is based on the knowledge that the dehumidifier unit is able to be completely arranged in the interior of a container if the temperature difference able to be achieved between warm side and cold side is correspondingly large. This is of major importance in particular when the interior of the container heats up during operation. So that the temperature difference between warm side and cold side can assume correspondingly large values, warm side and cold side must be well insulated from one another thermally. To this end, the Peltier element is clamped in between warm side and cold side by means of helical spring and clamping pin. This clamping pin forms a high thermal contact resistance, so that the warm side and the cold side are thermally well insulated from one another.

This arrangement in the interior of the container then requires a condensation operation even at temperatures which lie above the ambient temperature, since the warm side of the dehumidifier unit is separated by the container, more precisely by the container wall, from the ambient air and is therefore not in contact with the ambient air. It is to be assumed that the interior of the container is heated up by the devices and components located therein. Thus an efficient condensation operation is required in the temperature range between 8° C. and around 50° C. The temperature limits in this case do not represent any sharp boundary conditions imposed by technical conditions, but it has instead been shown that the condensation power able to be achieved outside the temperature limits is only marginal and thus questionable from an economic standpoint. The upper temperature limit at 50° C. must therefore be achieved with usable condensation power, since typical interior temperatures of containers with electrical and electronic components have been observed at around 45° C. In a power converter container in particular this value occurs because of load-dependent losses of the power converter and the ambient temperature. It has proved advantageous, for use in the interior of the container, to design the dehumidifier unit, through a good thermal decoupling of warm side and cold side, i.e. by avoiding parasitic heat return to the cold side, to be powerful enough for the temperature difference generated by the Peltier effect to have as high as possible a portion available on the cold side in the form of undercooling in relation to the inner temperature of the housing effective for the purposes of condensation of humidity.

Power converter containers, because of their installed components, are dependent to a particular extent on sufficiently dehumidified air in the interior space. Moreover the smooth functioning of the power converter is an absolute necessity for the drive of a vehicle, especially a railway vehicle, driven by said converter. To insure the operational capability of the vehicle a reliable operation of the power converter is necessary. Moreover vehicles, especially rail vehicles, must often fulfill special requirements in relation to fire protection. In such cases a resistance to burn-through of the surrounding surfaces of a container must be guaranteed. To fulfill this requirement it has proved sensible to arrange the dehumidifier unit in the interior of the container and to dispense with a cooling with ambient air, which is to be found outside the container. The arrangement inside the container without openings in the outer surfaces increases the stability in relation to burn-through. This facilitates the approval process in respect of fulfilling fire-protection requirements. A costly individual verification can often be dispensed with.

The use of the dehumidifier unit in a vehicle has likewise proved useful since, because of the clamping in by means of clamping pins, the dehumidifier unit is only sensitive to a small degree to vibration stress or shocks, which frequently impose a stress in vehicles and rail vehicles on the internal components.

Devices currently available on the market, in the said temperature range of the air at around 40° C. to 50° C., have only an inadequate condensation power or lose the capability for condensation completely through an increase of the temperature on the cold side. It has been shown that the increase in temperature can be reduced by the thermal insulation between cold side and warm side. Less electrical power for the operation of the dehumidifier unit is thus used, so that lower electrical losses also occur. Through the lower electrical losses the heating up of the cold side is reduced further and even higher temperature differences between warm side and cold side are able to be achieved.

The devices available on the market are designed for a nominal operating point of for example 30° C. with 80% relative air humidity. It has been established for these types of devices that the process of falling below the dew point temperature required for condensation on the cold side will no longer be reached if the housing interior temperature continues to rise. The significant reason for this is a temperature difference that is too small at the Peltier element itself.

The required increase in the temperature difference created by the Peltier element, with the same usable thermal load, in this case the condensation heat of the air humidity to be dissipated, can only be created by increasing the electrical current through the Peltier element. The marked rise associated therewith in the heat energy to be dissipated to the interior air only occurs in an inadequate manner, so that the overall temperature level of the active components of the Peltier dehumidifier unit rises. Included herein is a temperature increase on the cold side of the Peltier dehumidifier unit and thus also a reduction in the condensation power or even the loss of the condensation capability as a result of the dew point temperature being exceeded.

Moreover, the effect of the temperature increase on the cold side will be increased even more by a rise in temperature in the interior of the container. Satisfactory condensation powers are barely able to be achieved with previous devices or have not been able to be achieved since, to do this, the temperature of the condensation plate (cold side) must lie well below the dew point temperature.

Through a number of measures for example for improving the dissipation of heat on the warm side and for avoiding parasitic heat return from the warm side to the cold side at the dehumidifier unit, the advantage is gained that the dehumidifier unit is designed for dehumidifying air with a temperature in the range of up to 50° C. and can be operated continuously at this temperature. The advantage gained from the improved thermal decoupling is that the dehumidifier unit is designed for and can be operated for dehumidifying air with a relative humidity within the range of 10% to 30% and/or with a temperature ranging from 40° C. to 50° C. To do this a temperature difference of at least 40K is set between warm side and cold side. The installation of the dehumidifier unit in a container enables the warm side of the dehumidifier unit to be cooled not with the ambient air temperature but only with the internal air temperature. As a result of the electrical and/or electronic devices and components arranged in the container, such as semiconductor components for example, the interior of the container heats up, so that the dehumidifier unit will be operated at a temperature of around 40° C. to 50° C. Through the increased temperature, with the same absolute humidity in the air, the relative air humidity reduces to values of for example 20% to 30% relative humidity. It is precisely these ambient conditions that represent high demands for the dehumidifier unit. While dehumidifiers available on the market no longer have satisfactory condensation performance here, by contrast the proposed dehumidifier unit is suitable to a particular degree, even under the said conditions, for realizing satisfactory condensation performance.

It has turned out that the condensation performance can be further enhanced if the warm side and the cold side of the dehumidifier unit are even better separated from one another, i.e. are thermally insulated from one another, in order to avoid heat return to the cold side acting parasitically. To do this the Peltier element is clamped by means of one or more helical springs and one or more clamping pins between warm side and cold side. In this way long force-conducting paths of the mechanical connection arise between the warm side and the cold side for the constructional integrity of the Peltier dehumidifier unit but with the option, with a suitable choice of materials and cross-sectional design, of increasing the thermal resistance of force-conducting components. Through this heat return to the cold side acting parasitically is minimized, whereby the temperature on the cold side remains low and thus the condensation performance is increased. At the same time the reduction of the heat exchange allows a further increase of the temperature difference by increasing the current through the Peltier element, with a moderate rise in the electrical losses. Provided the effect of the higher temperature difference predominates in relation to the increased electrical losses, the condensation performance can be further increased. This makes possible the operation of a dehumidifier unit that is arranged in the interior of a container, even if the temperature in the interior of the container increases during operation of the components of the container.

Through the helical spring and the clamping pin a defined pressure of the Peltier element onto the warm side and the cold side will also be created. This produces an optimum thermal coupling of the Peltier element both to the warm side and also to the cold side of the dehumidifier unit. Moreover no or at least only a little gap-filling heat-conducting agent will be needed. This simplifies the manufacturing of the dehumidifier unit.

Moreover the construction by means of clamping in by helical spring and clamping pin offers a robust mechanical fastening of the cold side (condensation plate) in particular in respect of the vibration stresses to be expected when used in a vehicle or rail vehicle.

Moreover the inventive construction offers a thermal decoupling of the cold condensation plate (cold side) from the comparatively hot, or at least warm, warm side over long heat conduction paths. Long pin connections in particular have proved useful here.

A further advantage of the inventive design lies in its easier installation, without the requirement for precise adherence to very low tightening torques (e.g. 0.5 Nm) combined with great uncertainty in the reproduction, as are required when conventional screws of dimensions M3 or M4 are used.

Moreover, the clamping-in while using helical springs, compared to screwing together cold side and warm side with setscrews for example, is not sensitive to fluctuations in temperature and is thus advantageous. Helical springs, even by comparison with often recommended disk springs, because of the lower spring rate, need significantly greater spring paths of several millimeters to establish the clamping force. This means that the changes in length of the components conducting the clamping force of a few ¹/₁₀ mm that take place with large fluctuations in temperature remain insignificant in respect of a change in the clamping force of the system. Through the operation of various electrical devices, such as power converters for example, in the container, fluctuations in temperature occur in the container. This produces a large thermal stress on the clamping arrangement. The helical spring means that the compression force of the warm side and of the cold side on the Peltier element is almost independent of temperature, so that the lifetime of this arrangement can be markedly increased.

Moreover it has proved useful to arrange the helical springs on the warm side of the dehumidifier unit. This arrangement of the helical springs on the warm side, in particular when a heat sink is used, in which the helical springs are advantageously arranged between the cooling ribs, has the advantage that this represents a space-saving accommodation by comparison with an arrangement on the condensation plate side.

The inventive dehumidifier unit results in condensation present to a sufficient extent at 50° C. in the installation space as well as a high mechanical resistance to vibration and robustness. Moreover a compact design is able to be achieved for the dehumidifier unit. Furthermore, by the avoidance of stresses on the Peltier elements caused thermo mechanically, a high reliability of the inventive dehumidifier unit is insured.

In an advantageous embodiment of the invention the warm side, on the side facing towards the Peltier elements, has a gland-type seal, wherein the gland-type seal is embodied by a recessed area on the warm side with a rubber bush inserted therein, wherein the rubber bush surrounds the clamping pin at its inner diameter. It has proved advantageous to protect the space between cold side (condensation plate) and warm side from the intrusion of air containing water vapor. A rubber bush is used for this purpose, which is accommodated in a recessed area on the warm side. It surrounds the clamping pin at its inner diameter. The recessed area on the warm side, in particular on a heat sink advantageously arranged there, is dimensioned in its depth and shape so that the force of the helical spring presses the rubber bush together slightly and in this way the seal around the circumference of the clamping pin and around the circumference of the hole in the warm side is made. Moreover a further thermal decoupling between warm side and cold side is achieved by the rubber bush. The seal against air containing water vapor means that occurrences of corrosion that have a destructive effect on the Peltier elements, which lead to a marked reduction in lifetime, are reliably avoided.

In a further advantageous embodiment of the invention the clamping pin has a narrowing of its cross-section. The clamping pins, on account of the desired and required force fit, necessarily form a heat conduction path between the cold condensation plate (cold side) and the comparatively warm warm side. The flow of heat arising from this should remain as low as possible, since it involves parasitic losses. The narrowing of the cross-section contributes to increasing the thermal resistance in the heat conduction path. This makes a high condensation power possible.

In a further advantageous embodiment of the invention the warm side comprises a heat exchanger, in particular a heat sink, wherein a heat-spreading component is arranged between the heat exchanger and the Peltier element. The thermal resistance between the warm side and the ambient temperature (temperature of the air in the interior of the container) is reduced by the heat exchanger. For the minimization of the thermal resistance it has proved especially useful, by using a heat-spreading component, to use the heat exchanger surface of the heat exchanger only available to a limited extent because of the desired compact dimensions as effectively as possible. The heat-spreading component makes it possible to distribute the heat of the warm side as evenly and over as large a surface as possible on the heat exchanger. In particular even with a small difference between ambient temperature and heat sink temperature, this enables the heat to be reliably dissipated to the environment, so that there can be a condensation, even at high temperatures, as can occur for example in the interior of a container. Moreover the use of heat-conducting agents can be dispensed with completely, since the heat-spreading component already insures an optimum thermal connection to the surfaces with which it is in contact.

In a further advantageous embodiment of the invention the dehumidifier unit has at least one fan and a means of guiding the air, wherein the fan and the means of guiding the air is arranged in such a way as to create a flow of air, wherein the flow of air extends over cold side and warm side of the dehumidifier unit. It has proved advantageous in this case also to guide just a part of the air that is guided over the warm side, over the cold side beforehand. A further part of the air is only guided over the warm side. To this end appropriate means for air guidance, such as air guidance plates for example, are arranged on the dehumidifier unit. The fan is intended to dissipate the electrical drive energy fed in plus the quantity of heat arising during the water vapor condensation at a desired temperature level of the warm side that is as low as possible. Through this fan, which creates a cooling air flow over the warm side, a lower thermal resistance between the warm side and ambient (air within the interior of the container) is achieved. This is especially useful for establishing a high temperature difference between warm side and cold side. The dissipation of heat under these conditions—high ambient temperature with correspondingly reduced air density—with simultaneous requirement for reduced overtemperature at the heat exchanger (heat sink), can be achieved in a simple manner by an increase in the air flow. The overtemperature is necessary so that the heat exchanger can give off energy in the form of heat. Moreover it has proved useful to guide the flow of air such that the air is guided along the cold side before it passes the warm side. Thus the fan has the effect of moving the air both on the cold side and on the warm side. This enables the use of a further fan to be dispensed with. In this way a sufficient feed of interior air containing water vapor at the condensation plate can be insured. Through the air flow, which extends over the cold side and the warm side only one fan is needed, which moves the air. There is no need for separate fans for cold side and warm side respectively. This thus produces a cost saving and an increase in the reliability through the omission of one fan. By using only one fan both the supply of fresh air to the condensation plate (cold side) and also the cooling of the warm side can be reliably insured.

In a further advantageous embodiment of the invention the fan has an axial exhaust direction, wherein the axial exhaust direction is arranged at right angles to the surface of the cold side. Axial exhaust makes it possible to reduce the effective working height of the device, since required air cross-sections for the purposes of defined air outflow do not have to be taken into account. These have great relevance for the achievable and technically required cooling effect of the dehumidifier unit. Axial exhaust further makes it possible to mount an air duct on the outflow opening in the interior of the container, so that flow short circuits arising from the constricted space of the construction between fresh air (air to be dehumidified) and exhaust air (dehumidified air) can be eliminated relatively easily.

In a further advantageous embodiment of the invention the dehumidifier unit comprises a regulation device, which is designed to control a current through the Peltier element by means of pulse width modulation (PWM). In order to avoid ice formation at low temperatures it has proved advantageous to regulate the temperature of the cold side and thus the electrical current through the Peltier element. Compared to a two-state controller, if necessary equipped with a hysteresis function, the advantage of pulse width modulation lies in the fact the temperature fluctuations on the cold side will be reduced. Frequent thermocycles, caused by the high electrical current, through the Peltier element with corresponding fatigue stress on the Peltier element, as arise for example with the aforementioned two-state controller, make a premature failure of the dehumidifier unit likely. Through pulse width modulation on the other hand the current through the Peltier element can be regulated precisely such that no or only slight temperature fluctuations arise on the cold side. These lead, as a result of a lower thermal stress of the components, to a greatly extended lifetime of the dehumidifier unit.

In a further advantageous embodiment of the invention a seal between the cold side and a sealing frame is embodied by means of a sealing joint made of elastic or plastic material. Condensed humidity must be prevented from penetrating into the interior of the dehumidifier unit. Inadequate sealing of the Peltier elements in relation to the environment leads on the elements to corrosion on the cold side (lying inwards on the active Peltier crystals) and as a result of this to failure. The joint that is easily accessible during the manufacturing process, through its position and simple geometry, offers a good prerequisite for manufacturing a high-quality seal. The sealing is done with a sealing joint made from an elastic or plastic material. Compared to an O-ring, this has the advantage that no compression force is required for sealing, which presses on the seal component. It has proved useful to design the seal joint to realize a low thermal conductivity with a small thermal conductivity cross-section.

In a further advantageous embodiment of the invention the sealing frame in this case is embodied from a thermoset material. It has proved useful to use a material that has a low thermal conductivity, a low water vapor permeability and a comparatively high module of elasticity.

In a further advantageous embodiment of the invention a water vapor barrier with a heat insulating property is arranged on at least parts of the sealing frame. At high values of relative humidity condensation, occurs on components or sections of components with temperatures close to or below the dew point. The condensation arises unwanted on these components, since there is no provision in the design for an explicit dissipation of condensation at these locations. The condensation drips off unchecked, which is basically unwanted. For this reason the influx of air containing water vapor onto the surfaces of these components must be suppressed.

In a further advantageous embodiment of the invention the dehumidifier unit has a fan already described above, wherein the dehumidifier unit is arranged in the container such that a flow of air able to be created by the fan forms at least in sections along an outer wall of the container. It has proved especially useful to arrange the dehumidifier unit in the vicinity of the container outer wall. This is especially advantageous when the container involves an underfloor or roof container and the wall temperature lies below the interior temperature. The sucked-in air then has a comparatively low temperature, which represents more favorable working conditions for the dehumidifier. Higher condensation power and thus dehumidification effects can be expected. Moreover it is of particular advantage when the outflow of the fan is arranged in an axial direction in relation to the interior of the container and the sucking-in occurs in the opposite direction from the outer wall of the container.

In a further advantageous embodiment of the invention the container is designed to accommodate electrical and/or electronic components. Electrical and/or electronic components, as well as mechanical components too to some extent, with high air humidity, are subject to corrosion from the condensation that goes with it. This can lead to malfunctions or to failure of the corresponding components. Moreover this reduces the lifetime of these components significantly in some cases.

In a further advantageous embodiment of the invention the container is a power converter container and a power converter is arranged in the power converter container. The failure of a power converter, where it involves a vehicle, can lead to the failure of the entire drive. Costs arise for recovery and repair. Moreover, with a rail vehicle for example, claims for damages can be made by the users of the vehicle for example. Moreover semiconductors that are to be found in the power converter react in a very sensitive manner to moisture. A failure is mostly not caused by corrosion, so that it is also not evident to the naked eye beforehand. High reliability is therefore of particular importance for a power converter.

In a further advantageous embodiment of the invention the condensation power of the dehumidifier unit is controlled or regulated such that the temperature of the cold side assumes a value ranging between −5° C. and 10° C. The regulation can be controlled or regulated for example by variation of the electric current through the Peltier element. The lower the temperature, the more effective is the dehumidification. Because of the high power of the dehumidifier unit, low temperatures can be set on the cold side even with high ambient air temperatures. Thus the temperature range that the cold side can assume is very large. This large range can be used in an advantageous manner by a temperature at which a condensation with an especially high yield is able to be carried out being controlled or regulated for the cold side. This is produced in the temperature range between −5° C. and 10° C. A short-term icing associated therewith at temperatures below the freezing point can be taken into consideration in this case. To this end operating times with higher temperatures are provided, in which the ice melts and is drained away as water.

If a formation of ice is to be avoided, it has proved advantageous to regulate the temperature on the cold side to a range of between 0° C. and 5° C. Formation of ice will be prevented here, since the temperature does not drop below freezing point. Since no melting times have to be provided, it has proved useful to set the maximum temperature of the regulation/control range to 5° C.

In a further advantageous embodiment of the invention the condensation power of the dehumidifier unit is controlled or regulated such that the temperature of the cold side assumes a value of at least 40 K below the temperature of the warm side. In operation of the dehumidifier unit in the interior of a container it has turned out to be useful, because of the prevailing temperatures and values of the relative humidity, to operate the cold side and the warm side with a temperature difference of at least 40° C. Because of the thermal decoupling the value is able to be realized at the dehumidifier unit. This value can be controlled or regulated by means of the electric current through the Peltier element. In order to carry out a dehumidification reliably in a container of which interior is subjected to a heating-up, the dehumidifier unit must be able to create a temperature difference between interior temperature and dew point temperature. To do this it has proved especially useful to design the device, especially as regards the thermal decoupling, so that a temperature difference between warm side and cold side of at least 40° C. is set, in order reliably to guarantee a high condensation power.

In a further advantageous embodiment of the invention the dehumidifier unit has a first operating state and a second operating state, wherein in the first operating state humidity from the air is frozen as ice on the cold side and in the second operating state ice located on the cold side is converted to water, wherein the operating state is set by control or regulation of a current through the Peltier element.

It can be established that the condensation power increases with increasing undercooling of the cold side. With the objective of a high condensation power it is not sufficient just to fall slightly below the dew point temperature. The arrangement in the container makes it necessary to extract as much energy as possible from the condensation plate (cold side), which requires Peltier cooling power. This required Peltier cooling power needs drive current in the vicinity of the optimum working point of the Peltier dehumidifier.

As the humidity load on the dehumidifier sinks and as the ambient temperature falls too, without any reduction of the current in the Peltier circuit the temperature would fall below the 0° C. line on the cold side (e.g. at 30° C./40% rF). Ice is formed and thus the condensate would no longer be able to be transported away. In order to avoid permanent freezing on the cold side, either a) A nominal temperature value of 0° C.+X must be set, or b) More effectively: A swing of the nominal temperature value by a few degrees above and below 0° C. must be able to occur with repeatedly occurring defrosting stages, The swing takes place in time segments of e.g. 15-20 minutes with an amplitude of e.g. around 5K.

In order to set the operating states reliably it has proved useful to measure the temperature on the cold side and to influence it with the aid of the electric current through the Peltier element such that the temperature in the first operating state is set to below the freezing point of water, i.e. under normal conditions to below 0° C., and in the second operating state to above the freezing point of water, i.e. under normal conditions to above 0° C. With different values of air pressure, for example because of the operating height above sea level, the values given can change.

BRIEF DESCRIPTION OF THE DRAWING

The invention will be described and explained in greater detail below on the basis of the exemplary embodiments presented in the figures, in which.

DETAILED DESCRIPTION OF PREFERRED EMBODIMENTS

Figure 1:
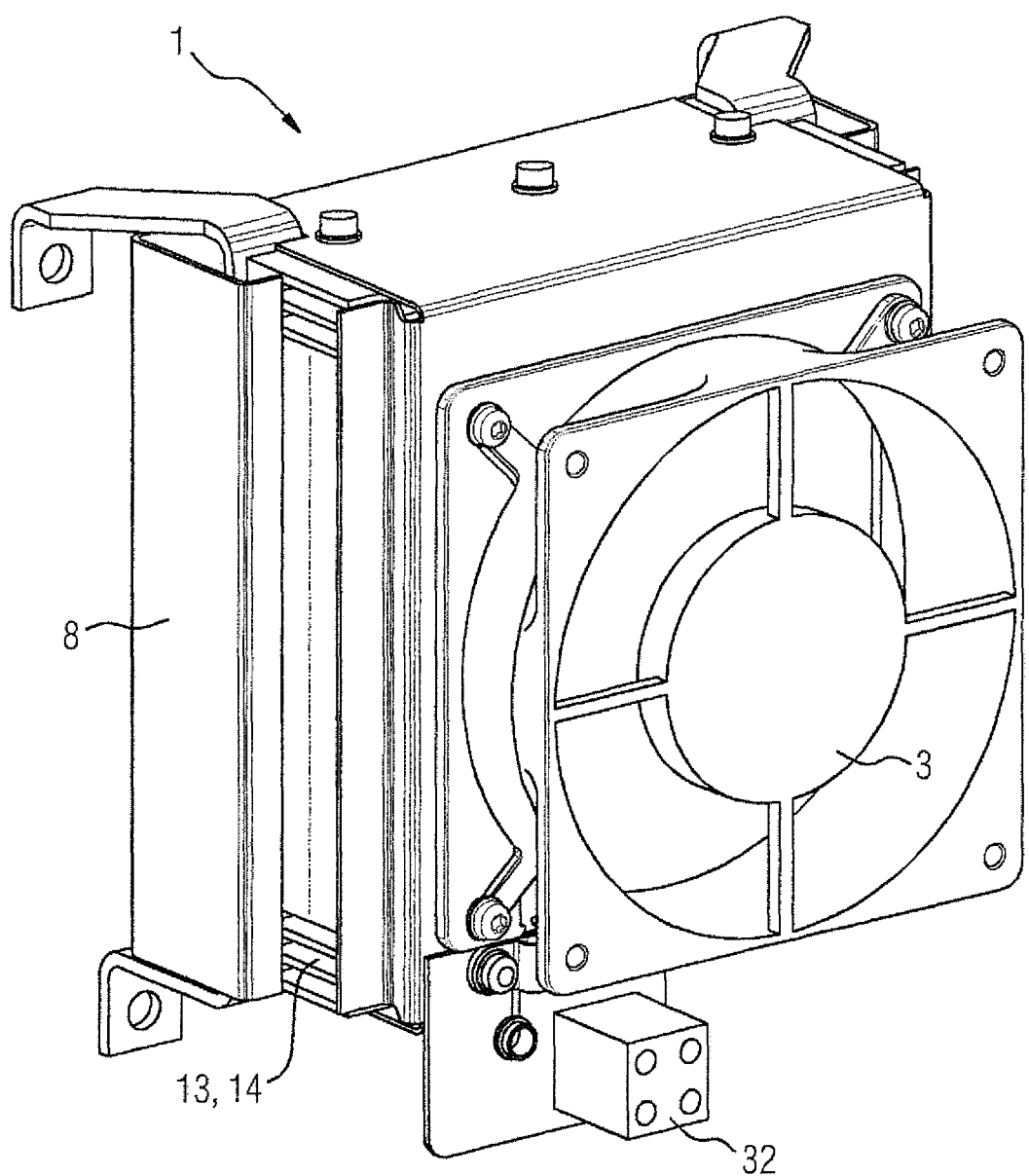
FIG. 1 shows a perspective view of the dehumidifier unit.

FIG. 1 shows the perspective view of a dehumidifier unit 1. The fan 3 can be seen in the foreground in this figure. The heat exchanger 13 of the warm side 12 is embodied as a heat sink in this exemplary embodiment. Arranged at the side, only to be seen from one side in this diagram, is a guide plate 8. A plug connector 32 is provided, inter alia for control, regulation and also for supply of energy to the dehumidifier unit 1, via which corresponding signals and energy are able to be transferred to the dehumidifier unit 1. The fan 3 creates a flow of air, which forms along the cold side 11 and the warm side 12 of the dehumidifier unit 1. This will be described in greater detail with reference to FIG. 2.

Figure 2:
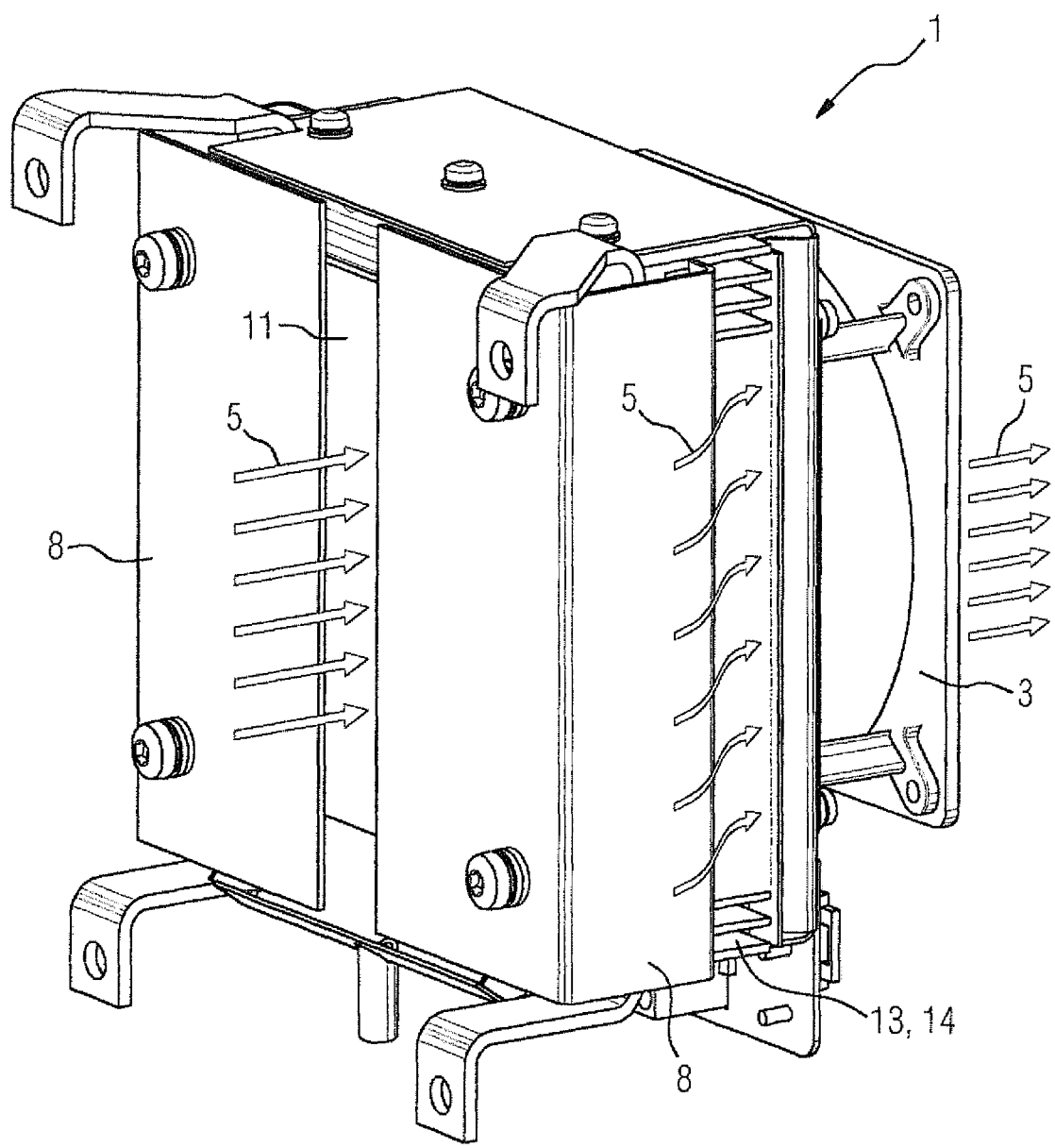
FIG. 2 shows a further perspective view of the dehumidifier unit.

FIG. 2 shows the dehumidifier unit 1 in a perspective view from another direction. To avoid repetitions the reader is referred to the description for FIG. 1 and also to the reference numbers given for this figure. The guide plates 8 of the dehumidifier unit 1 are arranged so that, when the fan 3 creates a flow of air 5, the air is set into motion such that a part of the air is moved along both on the cold side 11 and on the heat exchanger 13. A further portion of the air on the other hand will only be moved past the heat exchanger 13. It has turned out that an especially good condensation performance is produced if only a part of the air flow 5 is routed past the cold side 11.

Figure 3:
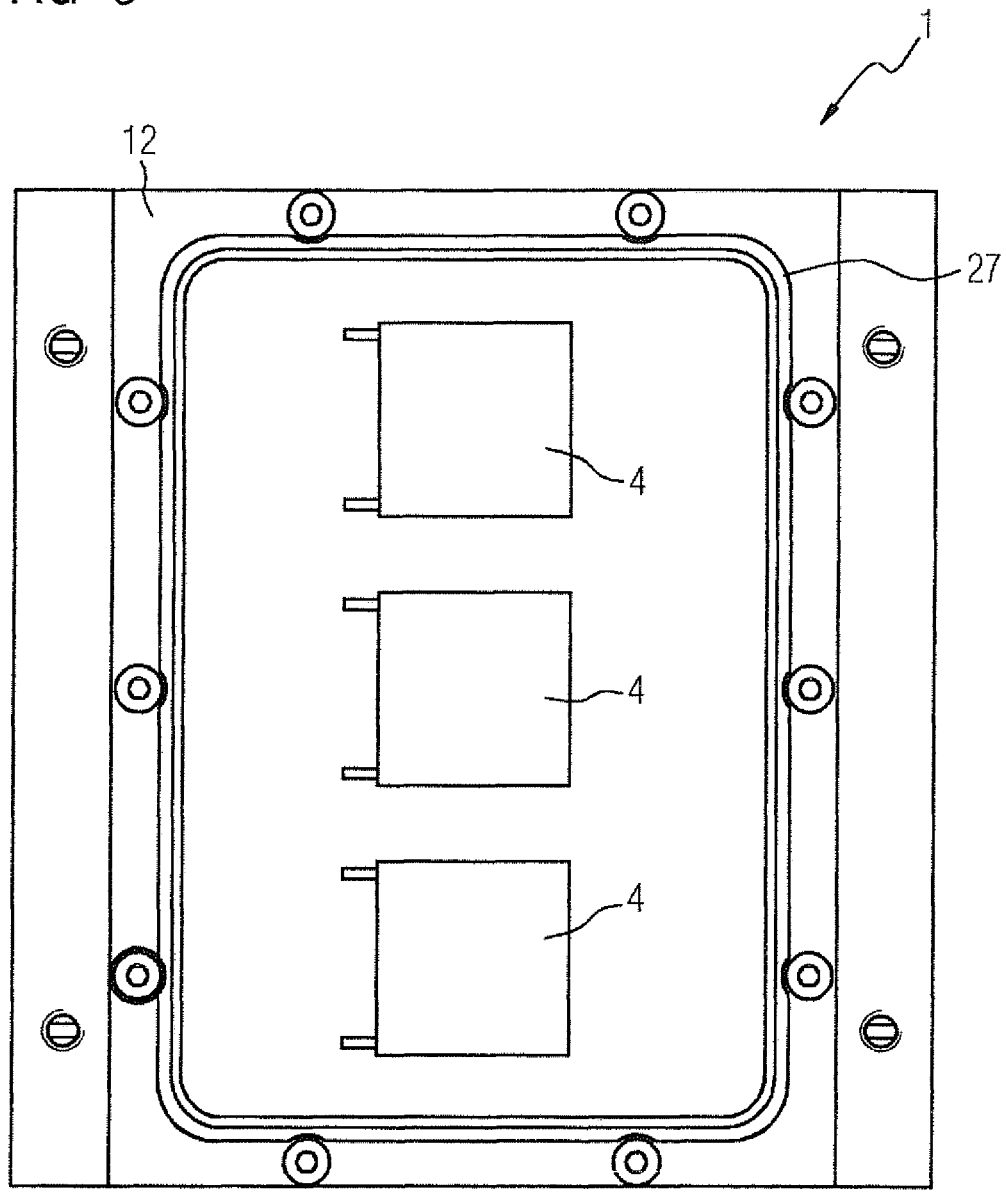
FIG. 3 to FIG. 5 each show a section through the dehumidifier unit.

FIG. 3 shows a section through the dehumidifier unit 1, wherein the cold side 11 is not shown. The Peltier elements 4 are arranged in thermal contact on the heat-spreading component 26 (see also FIG. 5 in this context). The heat-spreading component 26 is in contact with the warm side 12. The Peltier elements 4 together form the Peltier system 31 shown in FIG. 5. To increase the performance of the dehumidifier unit 1, a number of Peltier elements 4 are arranged thermally in parallel in this arrangement. To seal the dehumidifier unit 1 against the ambient air and against the cold side 11 not shown here, which is especially susceptible to the intrusion of humidity, a sealing frame 27 is provided. This sealing frame 27, preferably made of a non-metallic material, prevents the intrusion of humidity at the Peltier elements 4, which tend to corrode in the presence of humidity. This corrosion can lead to a short-term failure of the Peltier element 4 and thereby to the failure of the dehumidifier unit 1. This means that the corrosion has the effect of greatly shortening the lifetime of the dehumidifier unit 1.

Figure 4:
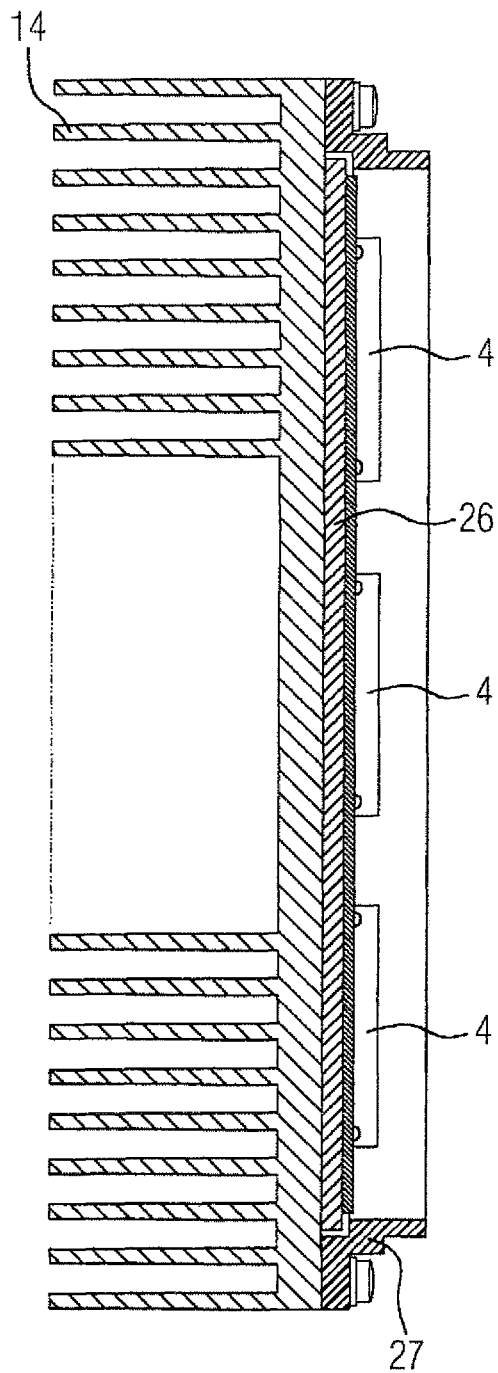

FIG. 4 shows a section through the dehumidifier unit of FIG. 3. A heat-spreading component is arranged between the heat exchanger 13 embodied as a heat sink and the Peltier elements 4. This component distributes the heat energy of the Peltier element 4 onto the surface of the heat sink 13, so that the temperature difference between heat sink 13 and Peltier element 4 is as small as possible. A lower thermal transfer resistance between heat sink 13 and Peltier element 4 is thus achieved, which makes it possible to operate the Peltier element 4 at a relatively low temperature. If the drop in temperature across the heat-spreader plate 26 is ignored, the temperature difference at the Peltier element is produced from the temperature of the warm side 12 and the temperature needed for the condensation on the cold side 11. The lower the temperature on the warm side 12 is, the smaller the temperature to be established by the Peltier element thus is. Thus an effective dehumidifying the air is possible even with a relatively small temperature difference at the Peltier element, whereby the use of electrical energy is minimized. Moreover FIG. 4 shows the sealing frame 27 of the dehumidifier unit 1, which reliably prevents the intrusion of humidity into the interior of the dehumidifier unit 1.

Figure 5:
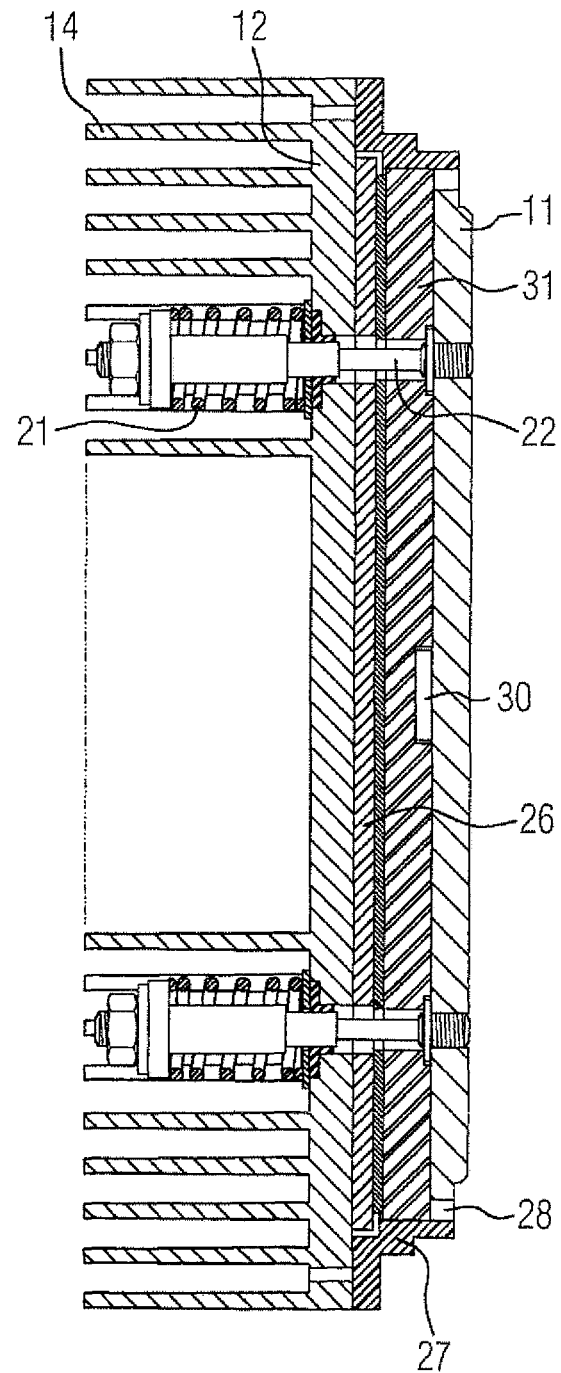

FIG. 5 shows a similar section to FIG. 4, but at the point at which the Peltier element 4 is clamped in between warm side 12 and cold side 21 by means of helical spring 21 and clamping pin 22. Moreover, unlike in FIG. 4, the cold side 11 is also shown in this figure. The cold side joins onto the sealing frame 27 via the sealing joint 28. To avoid repetitions the reader is referred to the description for FIG. 4 and also to the reference numbers given for this figure. The Peltier elements 4 are arranged inside the Peltier system 31 and fixed to one another. In this layout cold side 11 and warm side 12 are so well insulated thermally from one another that a high temperature difference between cold side 11 and warm side 12 is able to be realized by the Peltier elements 4. With the aid of the sensor 30 for detecting the temperature of the cold side 11, the temperature of the cold side 11 can be regulated, so that a high yield of condensation power is produced, and the freezing of the condensate is avoided in the event of a falling temperature and/or humidity loading.

Figure 6:
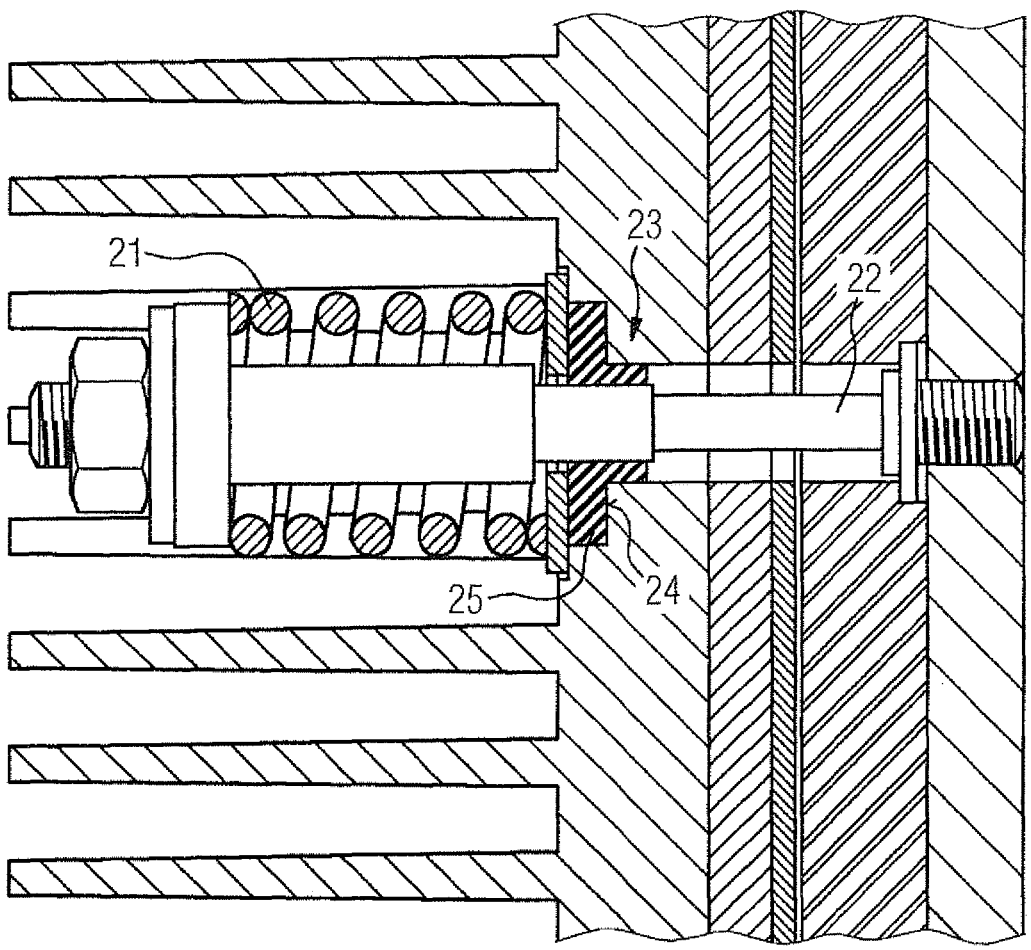
FIG. 6 shows a gland-type seal.

FIG. 6 shows the structure of an advantageous gland-type seal 23. A recessed area 24 is provided in the heat sink 13. A rubber bush 25 is introduced into this recessed area 24, which prevent the intrusion of humidity in the direction of the cold side 11 or the Peltier system 31 and the Peltier elements 4 arranged therein. To this end the depth and the shape of the recessed area 24 is designed such that the rubber bush 25 is compressed during fixing by helical springs 21 and clamping pins 22. An unavoidable thermal transfer between warm side 12 and cold side 11 via the helical springs 21 and the clamping pin 22 can be further reduced by the clamping pin 22 having a narrowed section. The narrowing here is a reduction of the cross-section over the length. In this case the cross-section is selected to be just large enough as required to transmit the necessary compression force between warm side 12 and cold side 11.

Figure 7:
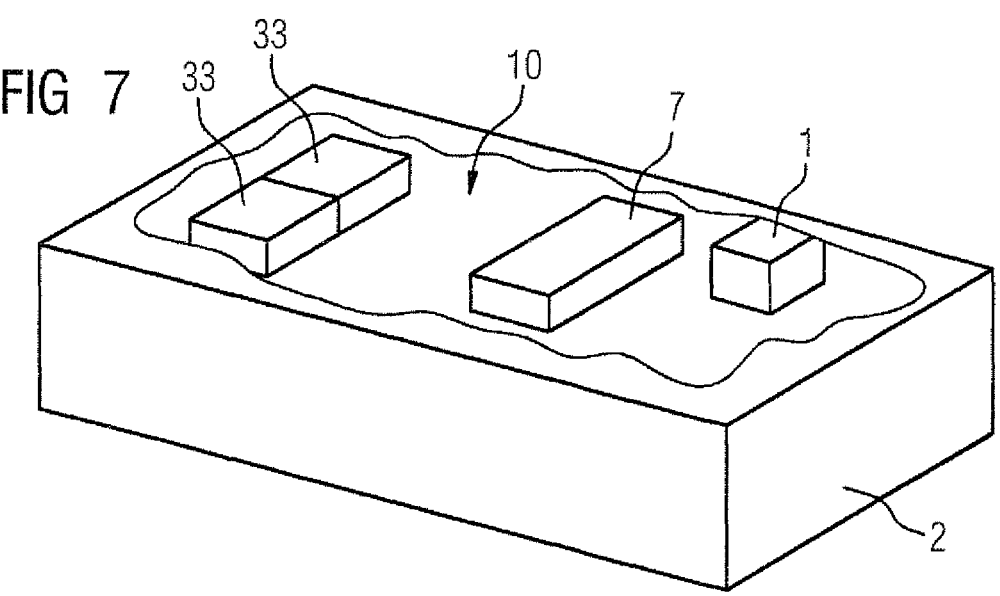
FIG. 7 shows a container with a dehumidifier unit arranged therein.

FIG. 7 shows a container 2 in which a dehumidifier unit 1 is arranged. This container 2 can be a part of a vehicle or a rail vehicle for example, in which components of the electrical drive are arranged. A power converter 7 belongs to the parts of an electrical drive for example. This must be operated so as insure a reliable operation of the vehicle and for realizing a long lifetime in a dry environment. To this end a dehumidifier unit 1 is arranged in the interior of the container 2. Further electrical or electronic components 33, in particular components that are sensitive to high air humidity, can also be arranged in the container 2. These components, including a power converter 7, heat the air 10 of the interior of the container 2 in such a way that a high temperature difference between cold side 11 and warm side 12 must be provided at the dehumidifier unit 1, to be able to extract humidity from the air 10. It has proved to be advantageous to arrange the dehumidifier unit 1 in the vicinity of an outer wall of the container 2 such that the air 10 sucked in by the fan 3 and routed past the cold side 11, if possible, will be conveyed at least in sections along the outer wall. Since the environment outside the container 2 often possesses a far lower temperature than the air 10 in the interior of the container 2, the brushing of the air 10 past the outer wall makes a temperature drop of the air 10 possible. This leads to the dehumidifier unit 1 being able to be operated more efficiently and with lower losses.

In summary the invention relates to a dehumidifier unit for dehumidifying air in a container with at least one Peltier element. So that the dehumidifier unit can be arranged completely in the interior of a container, it is proposed to embody the Peltier element as a single-stage Peltier element and to connect the Peltier element thermally to a cold side and to a warm side, wherein the cold side is embodied such that, during operation of the dehumidifier unit, humidity of the air condenses on the cold side. To insure the performance after installation in the container, the Peltier element is clamped in between cold side and warm side by means of a helical spring and a clamping pin. The invention further relates to a container with a dehumidifier unit of this type, wherein the dehumidifier unit is arranged completely in the interior of the container. The invention further relates to a vehicle, in particular a rail vehicle, with a container of this type. Moreover the invention relates to a method for dehumidifying air in the interior of a container by means of a dehumidifier unit of this type, wherein the condensation power of the dehumidifier unit is controlled or regulated as a function of the temperature of the cold side.

What is claimed is:

1. A dehumidifier unit for dehumidifying air in a container, said dehumidifier unit comprising:
    a cold side configured to condense humidity of air during operation of the dehumidifier unit;
    a warm side containing a heat exchanger;
    a Peltier element configured as a single-stage Peltier element and thermally connected to the cold side and to the warm side;
    a clamping mechanism structured to clamp the Peltier element between the warm side and the cold side, said clamping mechanism including a clamping pin having a head and a shaft passing through a smaller diameter opening extending between the warm side and the cold side and a helical spring which is arranged on the warm side; and
    a seal disposed on a side of the warm side in facing relation to the Peltier element, said seal including a rubber bush having a smaller diameter portion received in the smaller diameter opening in the warm side and a greater diameter portion received in a greater diameter opening in the warm side, said rubber bush having an inner opening through which the damping pin extends,
    wherein the clamping pin has a wider cross-section for a first length of the shaft adjoining the rubber bush and a narrower cross-section for a second length of the shaft extending beyond the rubber bush to the cold side, said narrower cross-section being smaller than the smaller diameter opening with a passage for air between the narrower cross-section and the smaller diameter opening, for increasing thermal resistance in a heat conduction path between the warm side and the cold side,
    wherein the rubber bush is compressed by the helical spring and the clamping mechanism reducing an intrusion of humidity in a direction of the cold side and reducing thermal conductivity between the warm side and the cold side.

2. The dehumidifier unit of claim 1, wherein the clamping pin is connected to the cold side.

3. The dehumidifier unit of claim 1, further comprising a heat-spreading component arranged between the heat exchanger and the Peltier element.

4. The dehumidifier unit of claim 1, further comprising at least one fan and an air guidance, the fan and the air guidance being arranged such as to create an air flow over the cold side and the warm side.

5. The dehumidifier unit of claim 4, wherein the fan is configured to generate an axial exhaust direction in perpendicular relation to a surface of the cold side.

6. The dehumidifier unit of claim 1, further comprising a regulation device configured to control a current through the Peltier element using pulse width modulation.

7. The dehumidifier unit of claim 1, further comprising a sealing frame and a sealing joint to provide a seal between the cold side and the sealing frame, said sealing joint being made of elastic or plastic material.

8. The dehumidifier unit of claim 7, wherein the sealing frame is made of thermoset material.

9. A container, comprising:
    an outer wall defining an interior; and
    a dehumidifier unit as set forth in claim 1, said dehumidifier unit arranged completely within the interior of the container and including a fan to generate a flow of air at least in one section along the outer wall of the container.

10. The container of claim 9, constructed to accommodate electrical and/or electronic components.

11. The container of claim 9, constructed in the form of a power converter container, and further comprising a power converter arranged in the power converter container.

12. A vehicle, comprising:
    a container having an outer wall defining an interior; and
    a dehumidifier unit arranged completely within the interior of the container and comprising a cold side configured to condense humidity of air during operation of the dehumidifier unit, a warm side containing a heat exchanger, a Peltier element configured as a single-stage Peltier element and thermally connected to the cold side and to the warm side, a clamping mechanism structured to clamp the Peltier element between the warm side and the cold side, said damping mechanism including a damping pin having a head and a shaft passing through a smaller diameter opening extending between the warm side and the cold side and a helical spring which is arranged on the warm side; and
    a seal disposed on a side of the warm side in facing relation to the Peltier element, said seal including a rubber bush having a smaller diameter portion received in the smaller diameter opening in the warm side and a greater diameter portion received in a greater diameter opening in the warm side, said rubber bush having an inner opening through which the clamping pin extends, and a fan to generate a flow of air at least in one section along the outer wall of the container,
    wherein the clamping pin has a wider cross-section for a first length of the shaft adjoining the rubber bush and a narrower cross-section for a second length of the shaft extending beyond the rubber bush to the cold side, said narrower cross-section being, smaller than the smaller diameter opening with a passage for air between the narrower cross-section and the smaller diameter opening, for increasing thermal resistance in a heat conduction oath between the warm side and the cold side,
    wherein the rubber bush is compressed by the helical spring and the damping mechanism reducing an intrusion of humidity in a direction of the cold side and reducing thermal conductivity between the warm side and the cold side.

13. The vehicle of claim 12, further comprising a power converter arranged in the container.

14. A method for dehumidifying air in an interior of a container, comprising controlling a condensation power of a dehumidifier unit defined in claim 1 as a function of a temperature of a cold side of the dehumidifier unit, with the provision that the temperature of the cold side is maintained in a range between −5° C. and 10° C., and that the temperature of the cold side is at least 40 K below a temperature of the warm side.

15. The method of claim 14, wherein the condensation power of the dehumidifier unit is controlled by controlling an electrical current through a Peltier element of the dehumidifier unit using pulse width modulation.

16. The method of claim 15, wherein the current through the Peltier element is controlled to adjust an operating state of the dehumidifier unit between a first operating state in which humidity from the air on the cold side freezes to ice, and a second operating state in which ice on the cold side is converted into water.

17. The method of claim 16, further comprising:
detecting the temperature of the cold side by a sensor; and
controlling the current through the Peltier element as a function of the temperature of the cold side such that, in the first operating state, a temperature below a freezing point of water is established, and, in the second operating state, a temperature above the freezing point of water is established.

* * * * *